Figure 1:
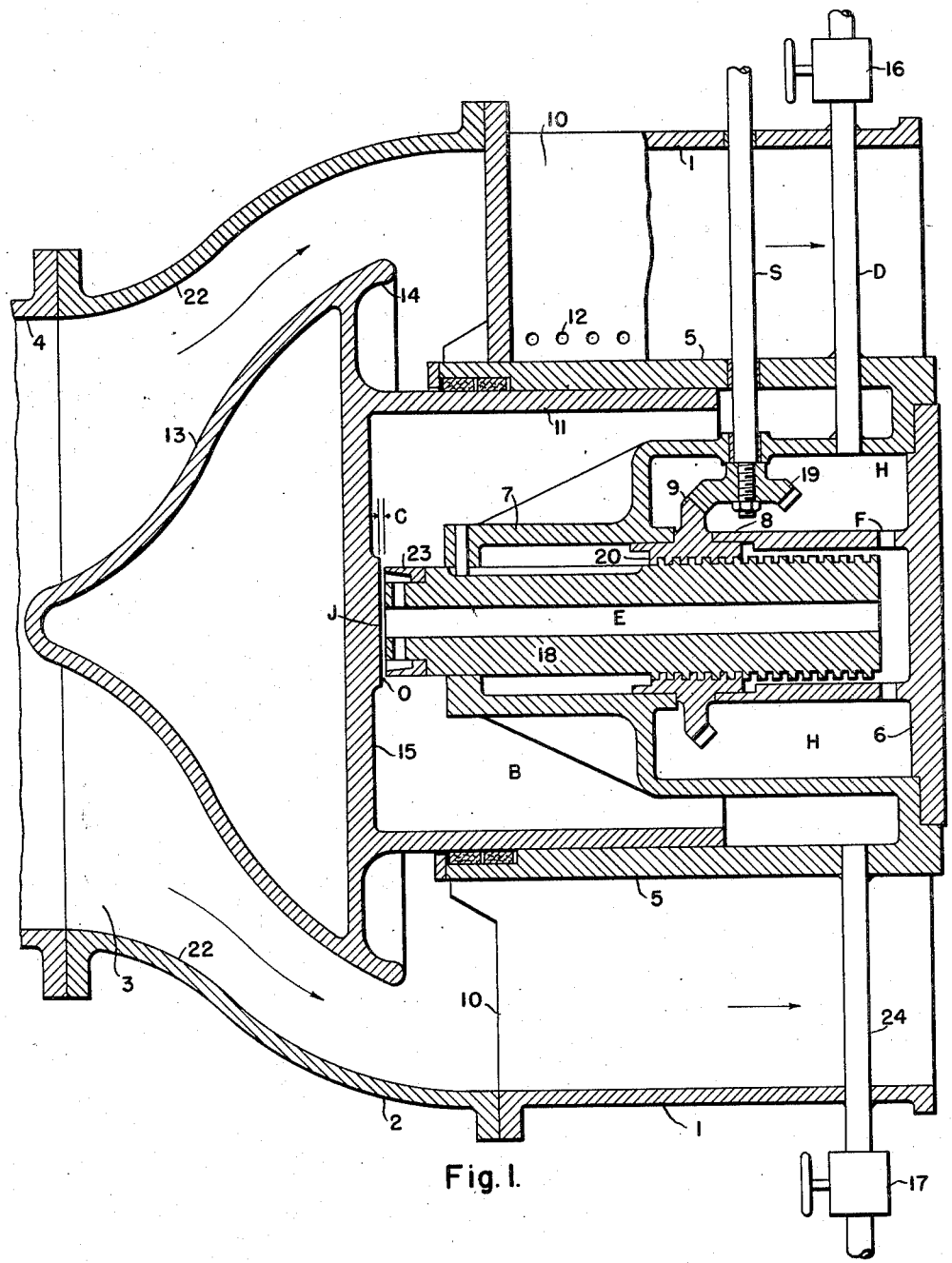

United States Patent Office 2,784,730
Patented Mar. 12, 1957

2,784,730
AUTOMATIC PILOT FOR HOLLOW-JET VALVES

Edward Y. Soomil, Palo Alto, Calif., assignor to Westinghouse Electric Corporation, East Pittsburgh, Pa., a corporation of Pennsylvania Application April 27, 1953, Serial No. 351,103

2 Claims. (Cl. 137—221)

My invention relates to control valves and, more particularly, relates to the actuating means for relatively large hydrostatically balanced liquid-flow-control valves.

My invention, as hereinafter disclosed, is applicable to hydraulic hollow-jet free discharge valves, but is not limited to this particular type of valve.

The hollow-jet valve to which my invention has been applied is disclosed in the patent of Byron H. Staats, No. 2,297,082, issued September 29, 1942. This valve is operated in the closing direction or the opening direction by means of a bevel gear arrangement. To provide for a transmission gearing and shaft structure of practical size, the valve is designed so that the static hydraulic force on the valve is fully balanced so that the power for driving the valve and transmission mechanisms, whether manually actuated or motor actuated, has to be large enough to overcome only the friction in valve guides and the other friction forces, and the hydrodynamic force on the valve. This is all fully disclosed in the mentioned patent.

To effect some economies in the size of the valve actuating mechanisms, when some actual hollow-jet valve installations were being made, a method of operating the valve by means of oil pressure acting to balance the hydraulic forces on the valve was proposed. By using oil at a higher pressure than the static hydraulic pressure on the valve, the piston area on which oil pressure acts and hence the valve skirt size can be very materially reduced, thus, reducing the size of the casing for a given valve opening, and consequently considerably reducing the cost of the valve.

In superimposing the arrangement I proposed and applied on the structure Staats discloses, the gear transmission is used to secure the valve in the desired position, with the force of the oil pressure first being used to move the valve against the hydraulic force. By opening a valve in the high-pressure supply line connected to the oil-pressure side of the piston for actuating the valve, the valve is caused to move in the closing direction until, in most cases, it is in the closed position. Then the gear transmission is actuated to the position corresponding to the valve opening desired, following which the oil valve in the high-pressure supply line is closed, and a valve in the drain pipe connected to the oil-pressure side of the piston for actuating the valve is opened to drain the oil away to thus cause the valve to recede from its closed position to the position set by the gear transmission, namely, recede to the valve opening desired. The valve will recede because the hydraulic force on the up-stream side of the valve will push the valve back, at a rate determined by the amount the drain valve is opened, until the valve is in the position selected by the mechanical drive.

The apparatus just discussed then involves basically a three-step operation, which, for the size of valves under consideration, often requires a considerable length of time as well as a step-by-step attention of the operating personnel. For example, if is desired to move the valve from the 100% open position to the 90% open position, the valve must first be actuated to the closed position (0% open) hydraulically, i. e. by the oil pressure, the mechanical transmission must then be actuated to the desired 90% open position, and then the valve must be caused to open to the 90% position. The time required for the three operations will, in this case, be in the order of 45 minutes, namely the better part of an hour.

One broad object of my invention is to improve the combination of the hydraulic and mechanical operating mechanisms for a valve.

Another broad object of my invention is the provision of actuating a hollow-jet free discharge valve from one position to another position in a one-step operation.

Another broad object of my invention is the provision of means for very materially decreasing the time of operation of a valve from one position to another position.

It is also an object of my invention to use a hollow-jet free discharge valve as an automatic bypass valve for hydraulic turbines.

A more specific object of my invention is the use of a pilot valve actuator driven by light gearing, which controls the pressure of the high pressure fluid on the valve actuating piston in such a way that, as the pilot moves, the valve moves with it and when it stops at any desired position the valve stops with it.

Figure 2:
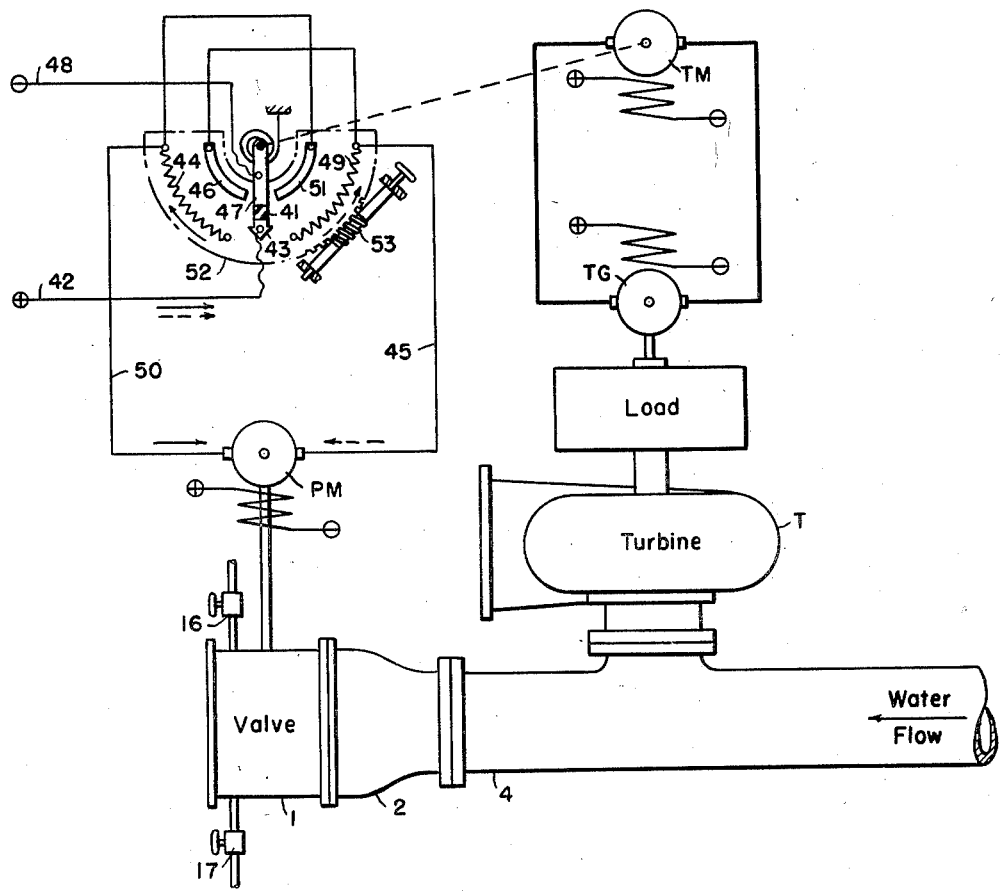

The objects stated are merely illustrative. Other objects and advantages will become more apparent from a study of the following more detailed description and the accompanying drawings, in which:

Figure 1 is a longitudinal sectional view of a hollow-jet free discharge valve provided with my novel valve actuating means; and Fig. 2 shows schematically how my novel apparatus is adapted to the control of a hydraulic turbine.

In the showing of Fig. 1 the casing 1 is generally cylindrical. At the front the casing is provided with a section 2 including the valve seating region which circularly tapers into an intake orifice, or opening, 3. The supply pipe 4 is secured to the front of the section 2. The securing means are not shown but it suffices to know that section 2 is secured by a fluid tight connection between the valve casing 1 and the supply pipe 4.

Within, and coaxially with casing 1 is positioned the valve carrying core comprising the outer shell 5, the base 6, the central guide 7, carrying the bearing 8 for the bevel gear 9.

Splitters 10 are positioned between the casing 1 and shell 5 to thus support the valve carrying skirt 11 within and coaxially of the casing.

The splitters have sharp front edges with the rear portion in the shape of a U to thus admit air from the outside of the casing to the apertures 12 to thus supply air to the central region of the tubular flow of the water from the casing. The harmful effects of cavitation are thus eliminated.

The valve 13 is carried by the skirt 11. The design is preferably such that the skirt 11 slidably engages the shell in suitable longitudinal guides or key-ways, not shown, so that the valve can not rotate with reference to the casing 1.

The valve diameter, since it is provided with the apron, or peplum, is considerably greater than the piston diameter of the piston portion 15. The valve for a given size can thus be provided with much smaller and thus less expensive hydraulic balancing means than would otherwise be the case. It will be noted that the area of the piston portion of the valve shown in the mentioned patent is equal to the effective area at the front of the valve on which the hydrostatic pressure of liquid in the supply pipe acts.

When such economy is to be effected in the size of the apparatus for hydrostatically balancing a valve then, of course, a higher liquid pressure must be maintained on the piston portion 15 of the valve.

Disregarding for the moment the pilot control I show it is apparent that by suitable adjustment of the size of the opening of the drain valve 16 and suitable adjustment of the size of the opening of the supply valve 17, the oil pressure on the piston portion 15 can be made to balance the hydrostatic pressure of the liquid in the supply pipe 4.

Further, if for the moment we consider the plunger 18, as operatively engaging the piston portion 15, then the valve actuating mechanism, comprising the motor driven shaft S, the bevel gears 19 and 9, and the screw type drive 20 between plunger 18, need only be big enough to overcome the friction of the parts and the dynamic pressure of the water as it moves from pipe 4 past the valve 13.

The supposed arrangement discussed in the preceding two paragraphs still require rather large power, heavy parts, and necessitates a slow three-step operation to effect a change in valve position from one position to some other selected position.

In my arrangement I utilize a relatively small plunger 18 slidably mounted in guide 7 and having the screw type drive 20 between the bevel gear 9 and plunger 18. To show the details of the plunger construction more clearly, the guide 7, the gears, and the plunger 18, are all shown on a larger scale than the rest of the valve. This type of hollow-jet free discharge valve for the hydroelectric installations with which it is used may have a diameter of twelve feet at the valve seating region 22, whereas the plunger may be less than a foot in diameter. The gear drive is thus relatively light.

The front end of the plunger is provided with a cup-shaped valve 23. This valve 23 and its function comprise an important part of my contribution to the art.

To better understand my contributions to the art a study of the functions of the devices described will be most helpful.

In practice the valve 17, or the oil pump supplying the high oil pressure is so adjusted that the oil pressure is sufficiently high, when acting on the piston portion 15 without modification of other control apparatus, to balance the highest static liquid pressure in practice encountered in pipe 4. The drain valve 16 is adjusted to be fully open to freely discharge oil into the supply reservoir not shown.

Oil under high pressure, produced by a suitable pump between the reservoir and valve 17, then flows through valve 17 and the conduit 24 into the chamber B, and then flows through the orifice O, internal pilot hole E, radial holes F, drain chamber H, drain pipe D, and valve 16 back to the supply reservoir.

Orifice O is formed by the small axial clearance C between the end of plunger 18 and plate J which is integral with the piston portion 15. The flow area of orifice O, for a given diameter of plunger 18, is a function of the axial clearance C. Hence, for a constant volume rate of flow through the orifice (constant displacement pump supply), the pressure in chamber B required to force oil flow through orifice O will depend on this axial clearance C.

An optional arrangement is to use a constant oil pressure supply and a controllable valve opening, as the valve 17, in the conduit 24 in combination with my pilot control. With the latter arrangement the pressure in chamber B, for a given opening of valve 17, is also a function of the clearance C.

The hydraulic force on valve 13 will move it toward the pilot plunger 18 until the orifice flow area is such that the pressure in chamber B is sufficient to maintain the flow of the operating oil. With the drain pressure constant, this means that the pressure in chamber B, i. e. the pressure acting on piston portion 15, will rise to a magnitude just high enough so that operating fluid force equals the hydraulic force. Thus, the valve 13 will stay at a fixed distance from the pilot plunger 18 as if it were mechanically attached to it.

When it is desired to close valve 13, the pilot plunger 18 is moved, by means of the transmission shown actuated by hand by a suitable electric motor, in the closing direction. This tends to decrease the clearance C, which in turn, creates a rise in pressure on the piston portion 15 just sufficient to overcome the static friction and the dynamic hydraulic force resisting the movement of valve 13, and move the latter in the closing direction. The clearance C will automatically adjust itself to a value at which the flow to the drain creates the pressure in chamber B required to balance the forces resisting the motion of valve 13.

As part of my invention I utilize a special pilot tip, or cup-shaped, valve 23. After the attendant brings the valve to the desired position, the high-pressure supply pumps can be stopped, and valve 17 closed. The heavy central portion of plunger 18 will thus support the full hydraulic force of the water on the upstream side of the valve. At the same time, the sensitivity of the pilot plunger 18 is obtained by the sharp edge of the cup-shaped valve 23 at the left-hand end of the pilot plunger 18. This valve 23 is so designed that the forces on the pilot plunger 18 are balanced, thus reducing the operating power required to a minimum.

The use of a hollow-jet valve as an automatically controlled by-pass valve for hydraulic turbines has many advantages but heretofore there has been no accurate control available for such valve to correlate the position of the valve to a selected turbine speed, power output, or other turbine characteristic.

In Fig. 2, I show one example of an automatic control. The turbine T, in addition to driving a load, is coupled to drive the tachometer generator TG. The output of this generator is proportional to turbine speed.

A torque motor is coupled to this tachometer generator TG. This torque motor drives the spring-biased arm 41, say clockwise when the turbine speed is too high.

When arm 41 moves clockwise from a neutral position a circuit is established from the positive bus 42 through the lower end 43 of arm 41 some, or all, of the resistor sections of resistor 44, the armature of the pilot plunger actuating motor PM, conductor 45, segment 46, the upper portion 47 of arm 41 to the negative lead 48. The pilot plunger is thus moved to open valve 13 to a greater extent to thus effect a slower operation of the turbine.

When the turbine operates too slow arm 41 is moved counterclockwise. When this takes place, a circuit is established from the positive lead 42, through the lower end 43 of arm 41 some, or all, of the resistor sections of resistor 49, conductor 45, motor PM, conductor 50, segment 51, the upper portion 47 of arm 41 to the negative lead 48.

It will be noted that the speed of operation of valve 13 is made proportional to the magnitude of the departure of the turbine characteristic by the coaction of the arm 41 and the resistors 44 and 49.

To make it possible to alter the neutral position of arm 41 the resistor sections 44 and 49 are mounted on a sector 52 which may be shifted by the drive 53. By shifting the resistor sections the initial valve opening for valve 13 may be selected and thereafter the control functions to maintain that valve opening. However, should the hydrostatic head change then the control still functions to maintain a selected turbine characteristic.

While I have shown but one type of pilot control and one application of my control, changes and modifications may be made by those skilled in the art, particularly after having had the benefit of my teachings, without departing from the scope and spirit of my invention.

I claim as my invention:

1. A fluid flow control apparatus including a valve structure having a first cylindrical casing adapted to receive fluid through a relatively small opening at one end of the apparatus and discharge the fluid at the other end of the apparatus from a relatively large opening in a second larger cylindrical casing, a valve seat between the first and second cylindrical casings, a third but cup-shaped cylindrical casing having a considerably smaller diameter than the diameter of the first casing, a main valve the movements of which are to be controlled with respect to the valve seat, a valve carrying skirt slidably mounted in the third casing, said skirt being also cup-shaped to thus form with said third casing a closed chamber of variable volume which volume depends on the position of the main valve, means for admitting fluid under pressure considerably higher than the pressure of the fluid in the first casing into said closed chamber to balance the hydrostatic pressure of the fluid entering the first casing through said opening, a longitudinally operable valve activating tubular plunger for engaging the inner bottom of the cup-shaped skirt, the end of the plunger adjacent the inner bottom of the cup-shaped skirt being provided with a cup-shaped valve structure with the edge thereof being relatively sharp to cause highly sensitive following movements of the skirt to the plunger movements to effect closing and opening of said valve, which closing and opening is effected by draining off the high pressure fluid in said closed chamber in proportion to the spacing of the relatively sharp edge from the bottom of the cup-shaped skirt, whereby the main valve is caused to be operated by the high pressure fluid in accordance with the position of the plunger.

2. In liquid flow control apparatus, in combination, a base comprising a generally cylindrical housing having a valve seat at the front, the valve opening at the seat being of considerably lesser diameter than the housing, a cylindrical sleeve bearing disposed concentric of the housing and having a lesser internal diameter than the valve opening, said sleeve being heremetically closed at the rear by a bottom wall, a hollow bearing structure projecting forwardly from the bottom wall and rigidly secured thereto, a hollow plunger disposed for longitudinal movement with a liquid-tight seal in the bearing structure, the rear of said plunger ending short of said bottom wall when in the fully retracted position to thus form a first chamber, conduit means for placing the first chamber in communication with a low liquid pressure region, a cup-shaped member having a skirt portion slidably fitting into the front of said sleeve with a liquid-tight seal and having a bottom whose inner surface is disposed substantially contiguous to the front end of the plunger, a valve carried by the bottom, means for admitting liquid under pressure higher than the liquid pressure at the valve opening into the chamber formed by the sleeve and cup-shaped member, whereby the valve will be moved as a function of the liquid pressure in the chamber and the clearance between the front of the plunger and the bottom of the cup-shaped member, a sharp-edged cup-shaped valve structure mounted on the front of the plunger and internally subject to the fluid pressure in the hollow of the plunger and thus to coact with inner surface of the bottom to sensitively control the pressure in the chamber, and means for moving the plunger longitudinally.

References Cited in the file of this patent
UNITED STATES PATENTS

| | | |
|---|---|---|
| Re. 18,849 | McClellan et al. | May 30, 1933 |
| 1,629,957 | Larner | May 24, 1927 |
| 1,824,916 | Moody | Sept. 29, 1931 |
| 2,059,649 | Pfau | Nov. 3, 1936 |
| 2,504,736 | Schwendner | Apr. 18, 1950 |